July 2, 1940. L. NOYER Re. 21,499

REFUSE VEHICLE AND THE LIKE

Original Filed July 10. 1935 5 Sheets-Sheet 1

L. Noyer
Inventor

By: Glascock Downing & Seebold, Attys.

July 2, 1940. L. NOYER Re. 21,499

REFUSE VEHICLE AND THE LIKE

Original Filed July 10, 1935 5 Sheets-Sheet 2

L. Noyer
Inventor

By: Glascock Downing & Seebold
Att'ys

REFUSE VEHICLE AND THE LIKE

Original Filed July 10, 1935 5 Sheets-Sheet 3

L. Noyer INVENTOR

By: Glascock Downing & Seebold Attys.

July 2, 1940. L. NOYER Re. 21,499
REFUSE VEHICLE AND THE LIKE
Original Filed July 10, 1935 5 Sheets-Sheet 4
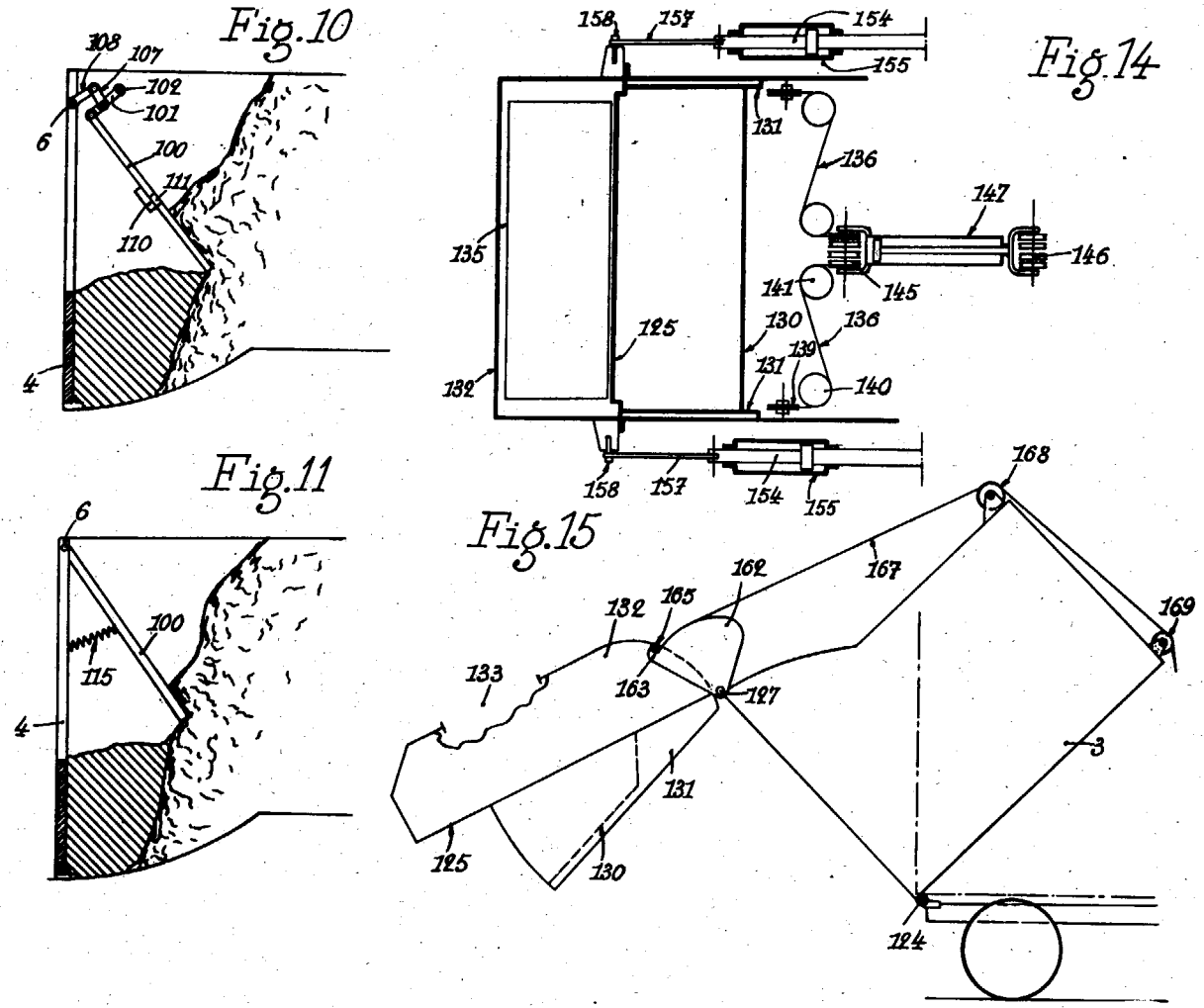
L. Noyer, Inventor
By: Glascock Downing & Seebold Attys.

REFUSE VEHICLE AND THE LIKE
Original Filed July 10, 1935 5 Sheets-Sheet 5
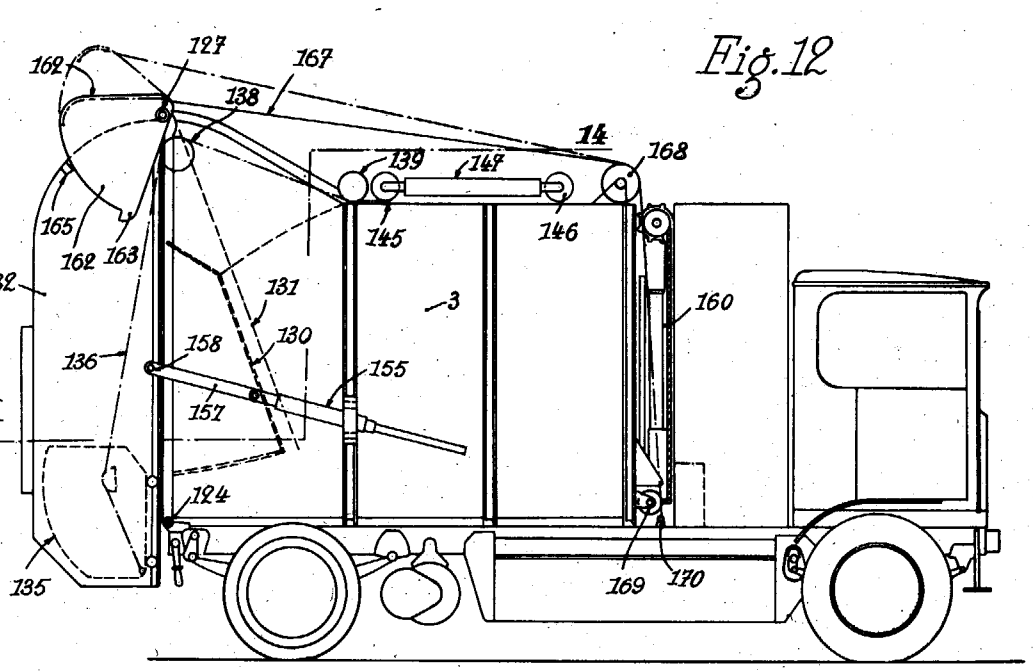
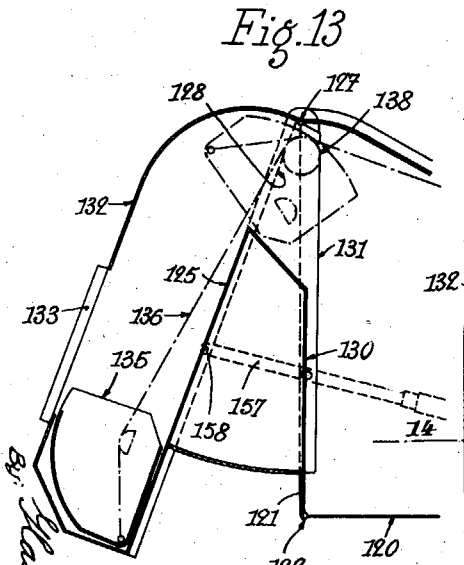
L. Noyer
Inventor
By: Glascock Downing & Seebold
Att'ys.

Reissued July 2, 1940

Re. 21,499

UNITED STATES PATENT OFFICE 21,499

REFUSE VEHICLE AND THE LIKE

Louis Noyer, Paris, France, assignor, by mesne assignments, to Gar Wood Industries, Inc., Detroit, Mich., a corporation of Michigan Original No. 2,091,519, dated August 31, 1937, Serial No. 30,719, July 10, 1935. Application for reissue August 14, 1939, Serial No. 290,079. In Belgium August 6, 1934

20 Claims. (Cl. 214—67)

The present invention has for its object a vehicle for the transport of all kinds of material and more particularly household waste, and the like.

According to the invention, the loading takes place at the rear of the vehicle body and the refuse or like material drops by gravity just in front of the rear panel of said body which receives alternating pivoting movements of relatively small amplitude, serving to distribute the material in the vehicle body and to push or pack it down after it has been loaded, and while the loading takes place.

Figure 1:
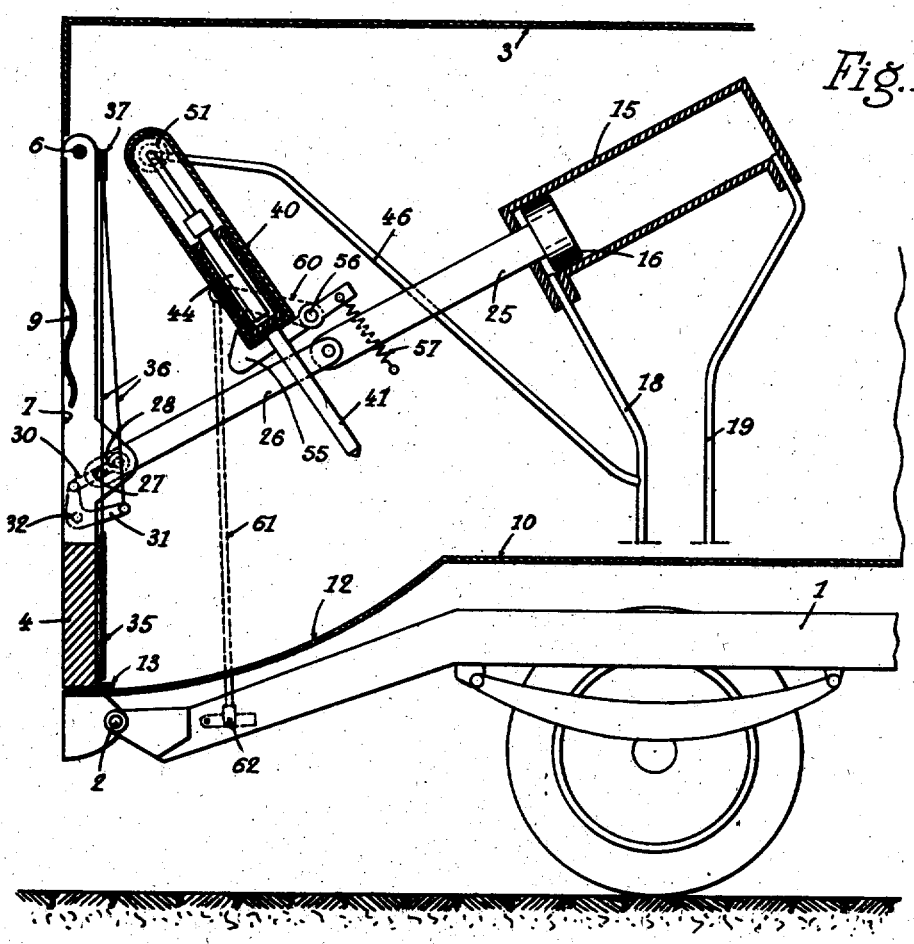
Figure 3:
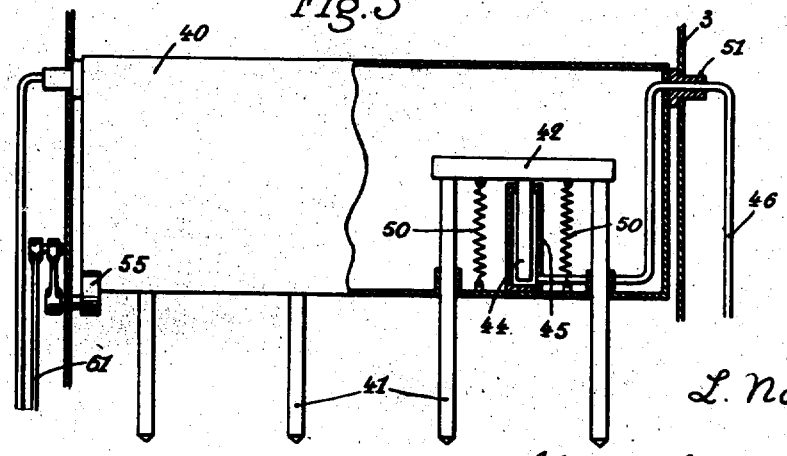
Figure 2:
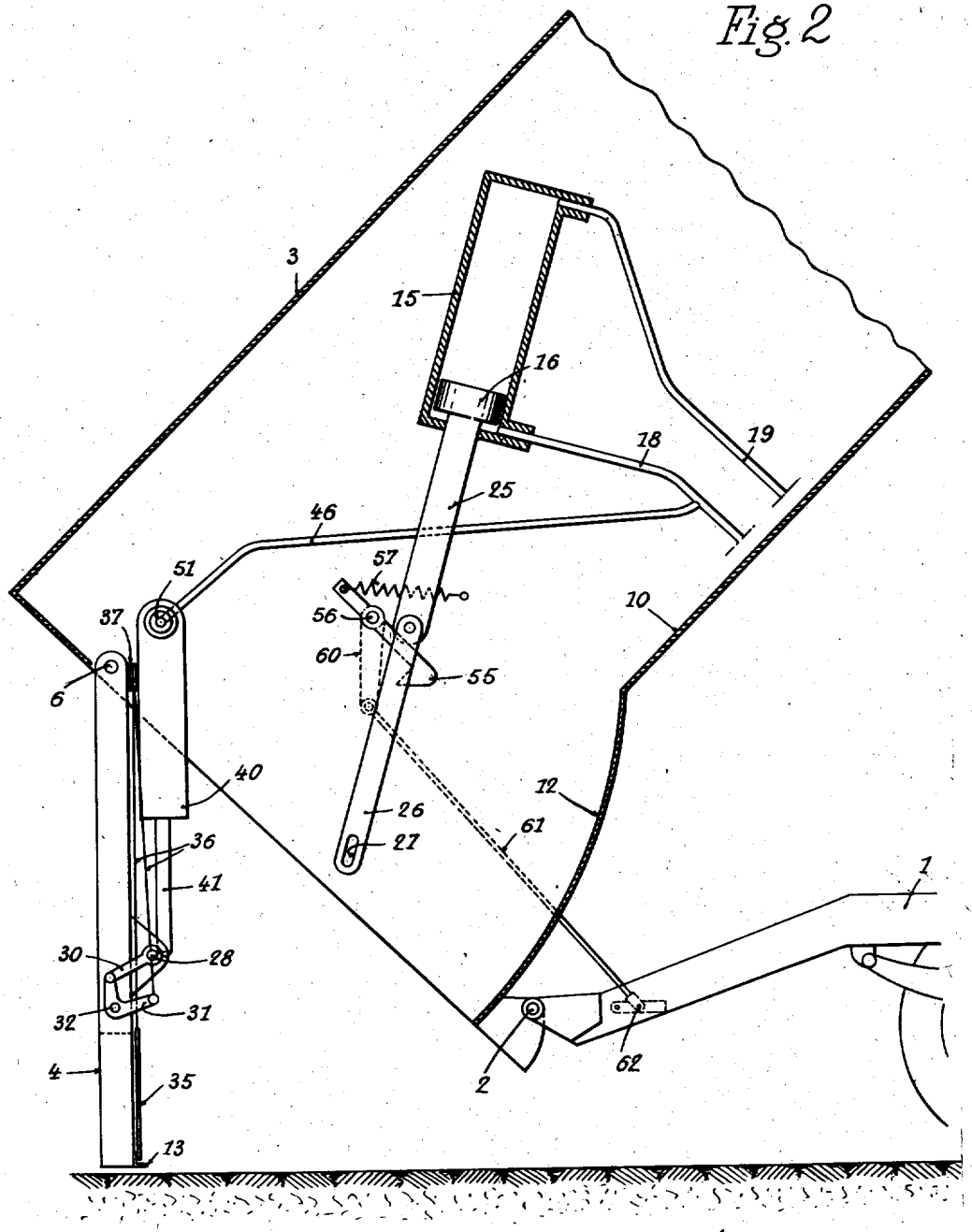
Figure 4:
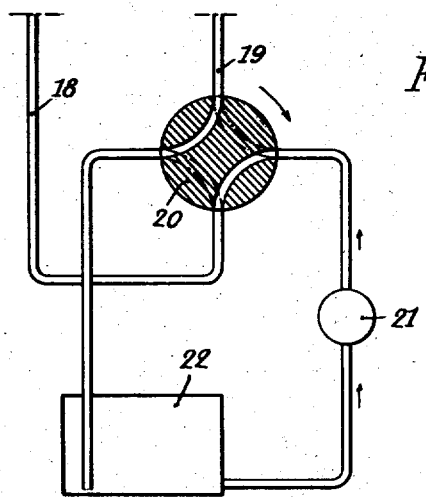
Figure 5:
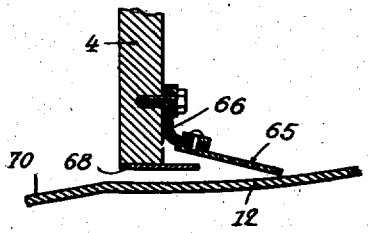
Figure 6:
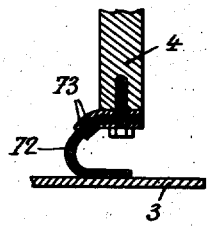
Figure 7:
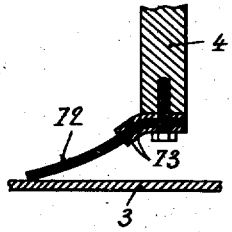
Figure 9:
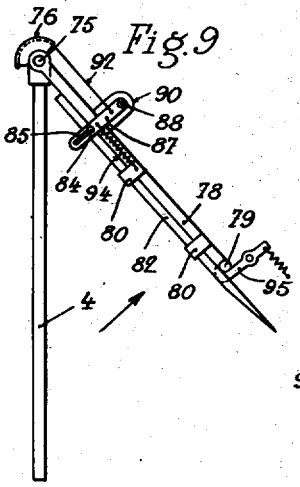
Figure 8:
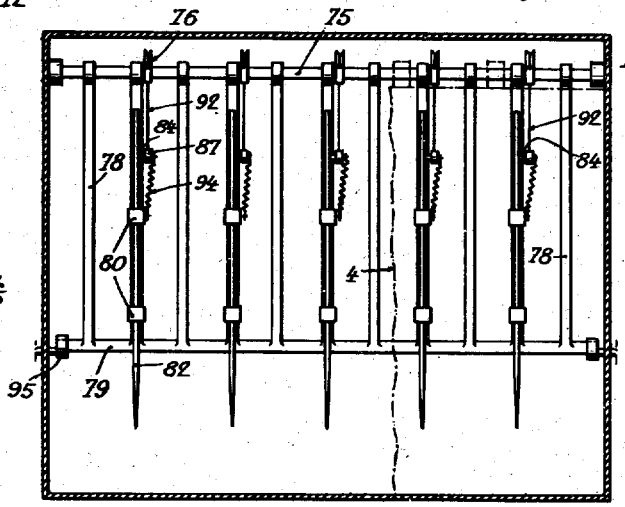

In the accompanying drawings given by way of example:

Fig. 1 is a longitudinal section of the rear part of a vehicle according to the invention, Fig. 2 is a similar view showing the vehicle in the discharge position, Fig. 3 is a view of the retaining screen, Fig. 4 is a diagrammatic view of a hydraulic control mechanism, Figs. 5, 6 and 7 show various embodiments of packing joints for the panel, Fig. 8 is a front view of another construction of the retaining screen in the direction of the arrow in Fig. 9, Fig. 9 is a corresponding side view, Figs. 10 and 11 show diagrammatically further embodiments of the retaining screen, Fig. 12 is a side view of another embodiment of the invention, Fig. 13 is a vertical section view of the embodiment shown in Fig. 12, showing some parts in another position, Fig. 14 is a diagrammatical view in horizontal section of the embodiment shown in Fig. 12, and Fig. 15 is a dragrammatical view of the embodiment shown in Fig. 12, showing the truck body in the dumping position.

As shown in Figs. 1 to 3, the vehicle comprises a frame 1 on which is pivoted at 2 a body or tank 3 adapted to contain the refuse to be collected and transported. The rear wall of said body is mainly formed by a panel 4 which is pivoted at its upper end at 6 and is provided at its upper part with a loading aperture 7. Said aperture is covered by a flexible curtain 9 of leather or the like in order to retain the dust in the body. The bottom wall 10 of the truck body is provided with a rear extension 12 having the form of a portion of cylinder whose axis coincides with the pivoting axis of panel 4. Said curved extension rises progressively from its rear end and merges into the flat bottom of the truck body without any raised part along the line of junction.

The lower edge of the panel is normally in contact with said rear extension. It is preferably provided with a packing band 13 of rubber or the like. A similar packing band, not shown, is provided along the vertical edges of the panel.

On the lateral walls of the body, inside the same, are mounted hydraulic jacks comprising a cylinder 15 containing a piston 16. Oil or another fluid under pressure is fed by flexible pipes 18, 19 to either end of the cylinder. As shown diagrammatically in Fig. 4 the pipes 18, 19 are connected through a two-way cock 20 to the delivery end of a pump 21 and to the feeding tank 22 for said pump respectively. The cock is rotated intermittently over a quarter turn by hand or any other desired means.

To the rod 25 of piston 16 is pivoted a connecting rod 26 having at its free end an elongated slot 27 through which extends a removable pin 28 engaging through a link 30 which is pivotally connected to one arm of a bell crank lever 31 pivoted at 32 on the rear panel 4 of the truck body.

On the inner side of the panel 4 is provided a vertically movable shutter 35 which is carried by a cable 36 guided over a pulley 37 and attached at its opposite end to the other arm of the bell crank lever 31.

In the body or tank is provided a retaining screen 40 for the packed material, which extends across the tank. Said screen comprises a flat box or casing in which are vertically guided a set of prongs or like members 41 secured by pairs on cross members 42 (Fig. 3). Each of said cross members carries a piston 44 movable in a cylinder 45 which is in communication by pipe 46 with the feed tank of the pump. Springs 50 urge the cross members 42 downwardly whereby the prongs 41 protrude through the bottom wall of casing 40.

The retaining screen is freely suspended by trunnions 51 in the side walls of the truck body. It is normally retained in the position shown in Fig. 1 by pawls or stops 55 which are secured on stud shafts 56 and held in operative position by springs 57. On each stud shaft 56 is keyed at the outside of the body, a lever 60 pivotally connected with a connecting rod 61 which is pivoted at a suitable point 62 on the vehicle frame.

The operation is as follows: the parts being in the position shown in Fig. 1, the refuse is collected and dropped through the loading aperture 7 on the curved extension 12 of the tank bottom. In view of the low level of the rear end of extension 12 the loading aperture is itself on a low level and the loading is thereby facilitated. When a sufficient amount of refuse has thus been loaded, the cock 20 is actuated so as to bring oil under pressure below piston 16. The piston is thereby moved towards the right end, when the end wall of the slot 27 in connecting rod 26 engages with the pin 28, the bell crank lever 31 is rotated and the shutter 35 is raised in front of the loading aperture so that the refuse collected does not risk to fall back and is safely retained in the tank. The panel 4 itself is thereafter driven upwardly by the connecting rod 26 through the medium of the lever 31. In said movement the curved wall 12 of the tank bottom is swept by the lower edge of the panel and the refuse deposited on the rear part of said curved wall 12 is thus progressively raised along said wall and pushed under compression upon the bottom 10 of the body. Thereafter the cock 20 is rotated so that the piston 16 is returned to the left and the panel 4 is thus returned to its initial position as well as the shutter 35.

As more refuse is dropped in the body, it is progressively packed therein by the oscillating movement of the panel as described above. When the bulk of refuse in the body is such that it would tend to fall backward towards the loading aperture, the retaining screen being in the position shown in Fig. 1 with the prongs protruding downwardly will act effectively to prevent this. It will be noted that as soon as the panel 4 is moved inwardly, oil under pressure is admitted by pipe 46 in the cylinders 45 of the screen and the prongs 41 are thereby retracted upwardly so that the height of the passageway above the upper portion of the curved wall 12 for the incoming refuse is increased. When the cock 20 is rotated so as to reverse the movement of the piston 16 the oil pressure drops in the cylinders 45 and the prongs are immediately returned to their lower position by the springs 50.

When it is desired to dicharge the refuse, the removable pin 28 is disengaged from the slot 27 and link 30 and the whole truck body is tipped rearwardly about the axis 2 in a well known manner, by means of hydraulic jacks or other usual means not shown. In this movement, the rod 61 will act upon the pawl 55 in such manner that the screen will be disengaged from the pawl and will thus fall by gravity to a vertical position as shown in Fig. 2. The refuse can thus be dumped easily.

When the truck body is restored to the horizontal position, the rear panel 4 and screen 40 will assume a vertical position and the connecting rod 26 can be attached to the link 30. In the next inward stroke of the panel, the screen will be pushed by said panel to its normal position in which it will be retained by the pawl 55.

Figs. 5, 6 and 7 show various embodiments of the packing arrangement for the edges of the panel. As shown in Fig. 5, the packing arrangement for the lower edge comprises an inclined blade 65 of sheet metal which is secured to the lower part of the panel by a rubber strip 66 acting as a hinge. A rigid plate 68 is secured on the lower edge of the panel 4 in order to retain the blade 65 in operative position. As shown in said figure, the bottom wall of the body may be provided with a sloping extension 70 in order to make sure that the blade will engage upon said bottom wall in the inward stroke of the panel.

Figs. 6 and 7 show a packing arrangement for the vertical edges of the panel. It comprises a rubber strip 72 reinforced with canvas and held between two oblique sheet metal pieces 73. When the panel enters the vehicle body for the first time after a dumping operation, the strip 72 is driven back and folded up as shown in Fig. 6. Later on and due to the oscillation of the panel in the truck body, the strip will straighten out and act as a scraper, as shown in Fig. 7.

Figs. 8 and 9 show another arrangement of the retaining screen. As shown in said figures, the rear panel 4 of the truck body is secured on a horizontal cross shaft 75 having sectors 76 secured thereto. The screen consists of a frame or grating comprising vertical bars 78 pivotally mounted on the shaft 75 and connected to each other at their lower ends by a horizontal bar 79. Some of the vertical bars 78 are provided with guides 80 in which the prongs 82 are adapted to slide. Each prong has a stud 84 working in a slot 85 provided in a lever arm 87 which is pivoted at 88 on lugs 90 of the frame. Each arm 87 is connected by a cable 92 to a corresponding sector 76 and is urged downwardly by a spring 94.

The prongs 82 are normally held in their lower position by the springs 94 acting on the arms 87. When the rear panel is swung inwards, the sectors 76 are rotated with the shaft 75 and the cables 92 move the arms 87 upwardly whereby the prongs rise so as to clear the passageway for the refuse. When the rear panel is brought back to its normal position, the prongs are returned to their lower retaining position. The screen is held in its retaining position by adjustable pawls 95 similar to pawls 55 above described.

Figs. 10 and 11 show diagrammatically simpler constructions of the retaining screen according to Fig. 10, the screen 100, which may be solid or constituted by a grating, is suspended to lever arms 101 pivoted at 102 on the truck body. Each lever arm 101 is connected by a link 107 to a lug or bar 108 secured to the rear panel. When the rear panel is moved inwards, the lug 108 raises the arm 101 and thereby the retaining screen. The screen is guided on spring controlled tappets 110 adapted to project inwardly from the side walls of the truck body and cooperating with lugs 111 carried by the screen.

As shown in Fig. 11, springs 115 are arranged between the rear panel 4 and the pivoted screen 100. Said springs are sufficiently strong to normally keep the screen in its retaining position. They are compressed by the rear panel in its inward packing stroke and the screen is thus raised to a certain extent, whereby the passageway for the material under the screen is increased.

Figs. 12 to 15 refer to another construction in which a lifting device for the refuse is arranged on the rear panel. As shown in said figures, the bottom wall 120 of the truck body which has no curved extension at the rear is provided at its rear end with a vertical flap 121 pivoted on an axis 122 which preferably coincides with the tilting axis 124 (Fig. 12) of the whole truck body.

The rear panel 125 which is pivoted at its upper end on a cross shaft 127 and has a loading aperture 128 carried on its inner face below the loading aperture a box or chest 130 adapted to enter the truck body above the flap 121. The upper face of said chest slopes downwardly as shown in Fig. 13 and the vertical side walls of the chest 130 are provided with extensions 131 so as to close the space above said chest on both sides.

On its outer face, the rear panel carries a casing 132 having a loading aperture 133 in the lower part of its rear wall and containing a loading bucket 135. Said bucket is hoisted by means of cables 136 passing over pulleys 138, 139 (Fig. 14) 140, 141, 145, 146 and actuated by means of a hydraulic jack 147. The bucket is guided in the casing 132 in such manner that it will tip downwardly when it reaches the upper end of its stroke, as shown in dotted lines in Fig. 13, so as to discharge the refuse over the chest 130.

The rear panel 125 together with chest 130 and casing 132 receives an oscillating movement from the pistons 154 (Fig. 14) of two hydraulic jacks 155 which can be mounted, as diagrammatically shown in Fig. 14 on the outer face of the side walls of the truck body. The piston rods of said jacks are connected by connecting rods 157 with the rear panel, a detachable connection being provided at 158. The control of the fluid under pressure in the jacks 155 can be effected by means similar to those described above. When the rear panel is moved by the jacks from the position shown in Fig. 13 to the position shown in Fig. 12, the refuse dropped by the bucket in front of the chest 130 is forced and compressed by said chest into the truck body.

In the arrangement described, the material is discharged by tilting the whole truck body and at the same time raising the rear panel 125 together with the adjoining chest and casing as shown in Fig. 15. The truck body is tilted by means of hydraulic jacks 160 (Fig. 12) arranged at the front part of the vehicle frame, in a well known manner.

On the cross shaft 127 carrying the rear panel, are loosely mounted two sectors 162, each sector having a shoulder 163 adapted to engage a corresponding lug 165 (Fig. 12) provided on casing 132. On each sector 162 is attached a cable 167 guided on pulleys 168, 169 and attached at 170 to the vehicle frame. When the connecting rods 157 of jacks 155 have been detached from the rear panel and the body is tilted, as shown in Fig. 15, the sectors 162 are thereby rotated and after a short idle stroke, the shoulder 163 on the sectors comes into engagement with the lug 165 on casing 132 and the panel is raised together with chest 130 and casing 132 so that the material is easily discharged.

The sectors 162 might be secured on the cross shaft 127. The arrangement described is however advantageous inasmuch as in their normal position, the sectors can thus be kept to a lower level, which reduces the height of the vehicle.

Having now described my invention what I claim as new and desire to secure by Letters Patent is:

1. A vehicle for the transport of household waste and like material, comprising a truck body adapted to receive said material, a panel adapted to act as a closing rear panel for said body and as a compressing member for the refuse in said truck body, said panel having a loading aperture therein and being pivoted at its upper horizontal edge on said truck body and controlling means adapted to impart to said rear panel an oscillatory motion about its upper horizontal edge for the purpose of packing the material in the truck body.

2. A vehicle according to claim 1, wherein said rear panel is pivoted substantially at the rear horizontal upper edge of the truck body.

3. A refuse vehicle according to claim 1, wherein the bottom of said truck body comprises a cylindrical rear portion adapted to be swept over by the lower edge of the rear panel and extending upwardly to the main part of said bottom, the axis of said cylindrical portion coinciding with the axis of oscillation of said rear panel.

4. A vehicle according to claim 1, further comprising flexible packing members along the edges of said rear panel.

5. A vehicle according to claim 1 and further comprising a flap-like member adapted to close the lower part of said loading aperture during the packing movement.

6. A vehicle according to claim 1, wherein a loading aperture is provided in the rear panel and further comprising flexible curtain means adapted to cover the said loading aperture.

7. A vehicle according to claim 1, further comprising a retaining screen inside said truck body for holding the material which already has been packed down and preventing it from falling down and occupying the free space in front of the inner side of said panel.

8. A vehicle according to claim 1, further comprising a retaining screen in said truck body for the packed material, a horizontal shaft on which said screen is pivotally mounted and adjustable stops adapted to hold the screen in the retaining position.

9. A vehicle according to claim 1, further comprising a retaining screen in said truck body for the packed material and means whereby the passageway between the bottom of the truck body and the lower edge of said screen is increased during the packing.

10. A vehicle according to claim 1, further comprising a retaining screen in said body, said screen comprising a supporting member pivoted on a horizontal shaft, retaining members movably mounted on said supporting member, and means for moving said retaining members with respect to the supporting member.

11. A vehicle according to claim 1, in which the truck body is pivoted at its rear part on the vehicle frame and the said controlling means are mounted on the body, and are detachably connected with the said panel.

12. A vehicle according to claim 1, in which the truck body is pivoted at its rear part on the vehicle frame and further comprising a retaining screen in the said body for the packed material, a horizontal shaft on which the said screen is pivotally mounted, adjustable stops for holding the screen in the retaining position, and means operatively connected with the vehicle frame, and adapted to move said stops to the inoperative position when the body is tilted with respect to the frame.

13. In a refuse vehicle, the combination of a body adapted to have refuse packed therein, a refuse receiving hopper adjacent the lower portion of said body, power means for elevating refuse placed in said hopper to a point adjacent the upper portion of said body and discharging it into said body, and power means for compressing and packing the discharged refuse into said body.

14. A structure as defined in claim 13 characterized by having hydraulically actuated means for compressing and packing the refuse into the body.

15. A structure as defined in claim 13 characterized by having hydraulically actuated means for elevating the refuse.

16. A structure as defined in claim 13 characterized by having hydraulically actuated means for elevating the refuse, and hydraulically actuated means for compressing and packing the refuse into the body.

17. In a refuse vehicle, the combination of a body adapted to have refuse packed therein, a rear end closure for said body pivoted thereto adjacent the upper edge thereof on a horizontally disposed pivot, a bucket adapted to receive refuse vertically movable on said rear end closure, means for moving said bucket from a position adjacent the bottom of said body to a point adjacent the top thereof and for discharging refuse from said bucket into said body, and power means for compressing and packing the discharged refuse into said body.

18. A structure as defined in claim 17 characterized by having hydraulically actuated means for moving the bucket.

19. A structure as defined in claim 17 characterized by having hydraulically actuated means for compressing and packing the discharged refuse into the body.

20. A structure as defined in claim 17 characterized by having hydraulically actuated means for moving the bucket upwardly and discharging its contents into the body, and hydraulically actuated means for compressing and packing the discharged refuse within the body.

LOUIS NOYER.